(12) United States Patent (10) Patent No.: US 7,066,746 B1
Togami et al. (45) Date of Patent: Jun. 27, 2006

(54) ELECTRONIC MODULE HAVING AN INTEGRATED LATCHING MECHANISM

(75) Inventors: Chris Togami, San Jose, CA (US); Guy Newhouse, Freemont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/389,509

(22) Filed: Mar. 14, 2003

Related U.S. Application Data

(63) Continuation of application No. 10/075,835, filed on Feb. 12, 2002, now Pat. No. 6,533,603, which is a continuation-in-part of application No. 09/971,885, filed on Oct. 4, 2001, now Pat. No. 6,439,918.

(51) Int. Cl.
*H01R 13/62* (2006.01)
(52) U.S. Cl. .................. 439/157; 439/484; 385/53
(58) Field of Classification Search ............... 439/372, 439/638, 76.1, 157, 160, 484; 385/53, 76, 385/70, 71, 89, 98, 88, 77
See application file for complete search history.

(56) References Cited

U.S. PATENT DOCUMENTS

| | | | |
|---|---|---|---|
| 4,083,619 A * | 4/1978 | McCormick et al. ....... | 439/352 |
| 4,387,956 A | 6/1983 | Cline | |
| 4,678,264 A | 7/1987 | Bowen et al. | |
| 4,798,430 A | 1/1989 | Johnson et al. | |
| 4,993,803 A | 2/1991 | Suverison et al. | |
| 5,039,194 A | 8/1991 | Block et al. | |
| 5,069,522 A | 12/1991 | Block et al. | |
| 5,071,219 A | 12/1991 | Yurtin et al. | |
| 5,195,897 A * | 3/1993 | Kent et al. .................... | 439/67 |
| 5,202,943 A | 4/1993 | Carden et al. | |
| 5,256,080 A * | 10/1993 | Bright ....................... | 439/342 |
| 5,329,428 A * | 7/1994 | Block et al. ................ | 361/785 |
| 5,416,871 A | 5/1995 | Takahashi et al. | |
| 5,487,678 A | 1/1996 | Tsuji et al. | |
| 5,528,408 A | 6/1996 | McGinley et al. | |
| 5,546,281 A | 8/1996 | Poplawski et al. | |
| 5,561,727 A | 10/1996 | Akita et al. | |
| 5,596,665 A | 1/1997 | Kurashima et al. | |

(Continued)

FOREIGN PATENT DOCUMENTS

DE 20005316 9/2000

(Continued)

OTHER PUBLICATIONS

Article Titled "Fiber Optic Module Interface Attachment," Oct. 1991, C. Baldwin, Published by Kenneth Mason Publication Ltd, England.

(Continued)

*Primary Examiner*—Briggitte R. Hammond
(74) *Attorney, Agent, or Firm*—Workman Nydegger (57) ABSTRACT

An integrated latching mechanism for use with a user pluggable electronic module, such as an opto-electronic transceiver module, is disclosed. The latching mechanism allows the user to selectively latch the module within a corresponding host port by manipulation of a lever formed on a bail. Movement of the bail causes a locking pin to extend and latch the module within the port. Conversely, movement of the bail can be used to disengage the locking pin and thereby allow the user to extract the module from within the port. Operative movement of the lock pin is accomplished by forming a cam on the bail lever. Movement of the bail lever thus causes movement of the cam, which corresponds to movement of a locking pin from a latched to a delatched position. The bail may be substantially disposed either within or outside of the electronic module.

19 Claims, 8 Drawing Sheets

U.S. PATENT DOCUMENTS

| | | | |
|---|---|---|---|
| 5,734,558 A * | 3/1998 | Poplawski et al. | 361/752 |
| 5,738,538 A * | 4/1998 | Bruch et al. | 439/160 |
| 5,767,999 A | 6/1998 | Kayner | |
| 5,820,398 A | 10/1998 | Stabroth et al. | |
| 5,879,173 A | 3/1999 | Poplawski et al. | |
| 5,901,263 A * | 5/1999 | Gaio et al. | 385/92 |
| 5,931,290 A | 8/1999 | Wehrli, III et al. | |
| 5,947,435 A | 9/1999 | Small | |
| 5,980,324 A | 11/1999 | Berg et al. | |
| 6,050,658 A | 4/2000 | O'Sullivan et al. | |
| 6,069,991 A | 5/2000 | Hibbs-Brenner et al. | |
| 6,074,228 A | 6/2000 | Berg et al. | |
| 6,081,431 A | 6/2000 | Lemke | |
| 6,088,498 A | 7/2000 | Hibbs-Brenner et al. | |
| 6,142,802 A | 11/2000 | Berg et al. | |
| 6,142,828 A | 11/2000 | Pepe | |
| 6,149,465 A | 11/2000 | Berg et al. | |
| 6,169,295 B1 | 1/2001 | Koo | |
| 6,179,627 B1 * | 1/2001 | Daly et al. | 439/76.1 |
| 6,229,708 B1 | 5/2001 | Corbin, Jr. et al. | |
| 6,231,145 B1 | 5/2001 | Liu | |
| 6,259,769 B1 | 7/2001 | Page et al. | |
| 6,299,362 B1 * | 10/2001 | Gilliland et al. | 385/92 |
| 6,350,063 B1 * | 2/2002 | Gilliland et al. | 385/88 |
| 6,430,053 B1 * | 8/2002 | Peterson et al. | 439/352 |
| 6,434,015 B1 | 8/2002 | Hwang | |
| 6,439,918 B1 | 8/2002 | Togami et al. | |
| 6,485,322 B1 * | 11/2002 | Branch et al. | 439/357 |
| 6,494,623 B1 * | 12/2002 | Ahrens et al. | 385/76 |
| 6,517,382 B1 | 2/2003 | Flickinger et al. | |
| 6,524,134 B1 | 2/2003 | Flickinger et al. | |
| 6,532,155 B1 | 3/2003 | Green et al. | |
| 6,533,603 B1 | 3/2003 | Togami | |
| 6,538,882 B1 | 3/2003 | Branch et al. | |
| 6,544,055 B1 | 4/2003 | Branch et al. | |
| 6,556,445 B1 | 4/2003 | Medina | |
| 6,570,768 B1 | 5/2003 | Medina | |
| 2002/0142649 A1 | 10/2002 | Baugh et al. | |
| 2002/0150343 A1 | 10/2002 | Chiu et al. | |
| 2002/0150353 A1 | 10/2002 | Chiu et al. | |
| 2003/0020986 A1 | 1/2003 | Pang et al. | |
| 2003/0044129 A1 | 3/2003 | Ahrens et al. | |
| 2003/0059167 A1 | 3/2003 | Chiu et al. | |
| 2003/0100204 A1 | 5/2003 | Hwang | |

FOREIGN PATENT DOCUMENTS

| | | |
|---|---|---|
| EP | 0456298 | 11/1991 |
| EP | 0442608 | 1/2001 |
| GB | 2297007 | 7/1996 |
| JP | 4165312 | 6/1992 |

OTHER PUBLICATIONS

Article Titled "Field Replaceable Optical Link Card," Feb. 1994, IBM, pp. 47-49.

Article Titled "Small Form Factor Pluggable (SFP) Transceiver Multisource Agreement (MSA)," Agilent Technologies et al., Sep. 14, 2000, pp. 1-38.

Article Titled "CD Laser Optical Data Links for Workstations and Midrange Computers," Ronald L. Soderstrom et al., IBM Business Systems, 5pgs.

Article Titled "Optical Link Card Guide/Retention System," Block, et al., *Research Disclosure*, Kenneth Mason Publications Ltd., Apr., 1993, No. 348.

Article Titled "Package for Electrical and Optical Components of Communications Port of Data Processing System," Jarvela, *IBM Technical Disclosure Bulletin*, Jan., 1985, vol. 27, No. 8.

Article Titled "XFP (10 Gigabit Small Form Factor Pluggable Module)," Ghiasi, et al., XFP MSA, 2002.

US 6,554,622, 04/2003, Engel et al. (withdrawn)

* cited by examiner

ELECTRONIC MODULE HAVING AN INTEGRATED LATCHING MECHANISM

RELATED APPLICATION INFORMATION

This is a continuation of application Ser. No. 10/075,835, filed Feb. 12, 2002, now U.S. Pat. No. 6,533,603 which is a continuation-in-part of application Ser. No. 09/971,885, filed Oct. 4, 2001, now U.S. Pat. No. 6,439,918. The content of the referenced applications is incorporated herein by reference.

BACKGROUND OF THE INVENTION

1. The Field of the Invention

This invention relates generally to the field of electrical connector systems for electrical components. In particular, embodiments of the present invention relate to a latching system that is particularly useful for use with low profile, user-removable, electronic modules that interface with a port of a host device. For example, embodiments of the present invention may find particular use with opto-electronic transceiver modules used to interface a host device with an optical communications network.

2. The Relevant Technology

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interferences that would otherwise interfere with electrical signals. Light also provides a more secure signal because it doesn't allow portions of the signal to escape from the fiber optic cable as can occur with electrical signals in wire-based systems. Light also can be conducted over greater distances without the signal loss typically associated with electrical signals on copper wire.

While optical communications provide a number of advantages, the use of light as a transmission medium presents a number of implementation challenges. In particular, the data carried by light signal must be converted to an electrical format when received by a device, such as a network switch. Conversely, when data is transmitted to the optical network, it must be converted from an electronic signal to a light signal. A number of protocols define the conversion of electrical signals to optical signals and transmission of those optical, including the ANSI Fibre Channel (FC) protocol. The FC protocol is typically implemented using a transceiver module at both ends of a fiber optic cable. Each transceiver module typically contains a laser transmitter circuit capable of converting electrical signals to optical signals, and an optical receiver capable of converting received optical signals back into electrical signals.

Typically, a transceiver module is electrically interfaced with a host device—such as a host computer, switching hub, network router, switch box, computer I/O and the like—via a compatible connection port. Moreover, in some applications it is desirable to miniaturize the physical size of the transceiver module to increase the port density, i.e., and therefore accommodate a higher number of network connections within a given physical space. In addition, in many applications, it is desirable for the module to be hot-pluggable, which permits the module to be inserted and removed from the host system without removing electrical power. To accomplish many of these objectives, international and industry standards have been adopted that define the physical size and shape of optical transceiver modules to insure compatibility between different manufacturers. For example, in 1998, a group of optical manufacturers developed a set of standards for optical transceiver modules called the Small Form-factor Pluggable ("SFP") Transceiver MultiSource Agreement ("MSA"). In addition to the details of the electrical interface, this standard defines the physical size and shape for the SFP transceiver modules, and the corresponding host port, so as to insure interoperability between different manufacturers' products. The standard also specifies that the module be hot-pluggable. To do so, the standard specifies that a user provide a minimum amount of space between host ports, so that transceiver modules can be individually accessed and removed from the host device without disturbing the adjacent modules and/or cable connections.

While such standards may recommend that there be a minimum distance between adjacent ports, there is often a desire to provide configurations having a higher port density. However, providing a high port density can be at odds with the ability to provide a module that complies with existing standards—i.e., that has a small form-factor and is hot-pluggable. In particular, previously existing module designs present a size and profile that mandates that a specific minimum amount of space be provided between host ports so that individual modules can be accessed and removed without disturbing an adjacent module and/or an adjacent fiber cable. Such modules either cannot be used in a device having a high port density (due to the space requirements), or, if used in such an environment, require the use of a special extraction tool to allow for access and retrieval of a module without disturbing adjacent modules and/or cables. Use of an extraction tool is often not desirable because it raises costs, can be misplaced, and may not be compatible with other module designs.

Therefore, there is a need for a module, such as an optical transceiver module, that utilizes a latching scheme that allows the module to maintain its small form factor and that still complies with existing standards. At the same time, the latching scheme should allow the module to be easily inserted and extracted from a port without the need for a special extraction tool. Moreover, extraction should be possible in a manner that does not disturb the communications link of adjacent modules, i.e., extraction should be achieved without inadvertently removing an adjacent module and/or fiber cable, even in a host having high port density. Such a module would allow host systems to provide a higher packing density, and yet allow the use of small form factor transceiver modules that comply with existing standards.

BRIEF SUMMARY OF EMBODIMENTS OF THE INVENTION

These and other problems in the prior art are addressed by embodiments of the present invention, which relates to an electronic, pluggable module that is equipped with a unique latching mechanism. In an illustrated embodiment, the module is an opto-electronic transceiver module, typically used to interface an optical transmission cable medium to a host device, such as a network switch, hub, router, computer or the like.

In one preferred embodiment, the module is formed as a small form-factor pluggable ("SFP") device in accordance with existing industry standards. Moreover, the module is capable of being operatively received within a compatible port provided by the host device. It will be appreciated that while preferred embodiments are illustrated and described as an opto-electronic transceiver module, the present invention is not limited to that particular environment. Indeed, teachings of the present invention could also be utilized in any type of pluggable electronic module.

In an exemplary embodiment, the module includes a base portion that supports a printed circuit board (PCB) upon which is disposed the electronics needed for the functionality of the module. In addition, the PCB has an edge connector formed at one end that is capable of electrically interfacing with the host device when the module is operatively received within the device port. Also disposed on one end of the base portion is at least one receptacle capable of physically receiving and interfacing with a corresponding optical fiber connector, which in turn is connected to a fiber optic cable. In a preferred embodiment, an outer housing encloses at least a portion of the base and the PCB to protect the electronic and optical components from dust and the like. Moreover, the housing defines an outer periphery that conforms in size and shape to the corresponding host port. In one preferred embodiment, the size and shape correspond to specifications defined by the MSA standard. Of course, other shapes and sizes could be used.

In illustrated embodiments, the module includes an integrated latching mechanism that provides several preferred functions. In particular, the latch mechanism provides the ability to releasably secure the transceiver module within the host port. Moreover, the latch mechanism can be implemented within a transceiver module having a SFP package, and can be done so with mechanical dimensions that do not violate industry standards. The latch mechanism permits easy extraction and insertion of the module by a user, even when it is used in a host device having a high-density port configuration—both laterally and vertically. Further, extraction can be accomplished without the use of a specialized extraction tool, and without disturbing adjacent modules and/or cables.

In one preferred embodiment, the latch mechanism is operated by way of a moveable bail lever. The bail is moveable between two positions, which in turn dictate the position of a locking pin. When placed in a latched position, the locking pin extends from the module and engages with a corresponding recess within the host port. In this position, the module is latched and secured within the port. When the bail is moved to an unlatched position, the locking pin is disengaged from the locking recess, which permits the module to be extracted from the port.

In the exemplary embodiment, movement of the locking pin by way of the bail is accomplished with a cam portion that is integrated with the bail lever. Rotation of the bail causes manipulation of the cam, which in turn operates against a cam follower surface formed on a pivot block which carries the locking pin. When in the latched position, the cam is disengaged from the cam follower surface, and a biasing means formed on the housing urges the pivot block to rotate the locking pin into the latched position. In contrast, in the unlatched position, the cam forces the pivot block to rotate the locking pin so that it is disengaged from the locking recess.

In addition to manipulating the latching mechanism, the bail also provides a lever for removing the module from the port. Thus, when positioned in the unlatched position, the bail extends outwardly to the front of the module, so that a pulling force results in the removal of the module. Importantly, in preferred embodiments the bail provides a handhold portion, so that this removal can be accomplished with a user's finger, and doesn't require the use of a specialized extraction tool. Moreover, since the bail is positioned in the front of the module, the module can be removed without disturbing adjacent modules and without disturbing adjacent cables—even when used in a host device having a high port density.

In one embodiment, a substantial portion of the bail is rotatably disposed within the interior of the receptacle portion of the module. This protects the bail when it is rotated from the latched position to the unlatched position such that inadvertent contact of the bail with other objects, such as adjacent cables, is avoided. Moreover, in preferred embodiments the shape of the bail is such that when the connector of the fiber cable is positioned within the receptacle, the bail cannot be moved to the unlatched position. This prevents accidental removal of the module from the port, such as may otherwise occur when the cable or plug are inadvertently pulled.

The foregoing, together with other features and advantages of the present invention, will become more apparent when referred to the following specification, claims and accompanying drawings.

BRIEF DESCRIPTION OF THE DRAWINGS

In order that the manner in which the above recited and other advantages and features of the invention are obtained, a more particular description of the invention briefly described above will be given by making reference to a specific embodiment that is illustrated in the appended drawings. These drawings depict only one embodiment of the invention and are not to be considered limiting of its scope.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to an electronic module, such as an optical transceiver module, that utilizes a unique integrated latch system to releasably secure the transceiver module within a host slot or port. Moreover, the latch system can be implemented within a transceiver module having a low profile, and without violating existing industry standards, such as those specified in the SFP Transceiver MSA. The latch system permits easy extraction and insertion of the module by a user, even when it is used in a host system having a high-density port configuration, i.e., when the modules are disposed in ports immediately adjacent to one another in one or both lateral dimensions. Further, extraction can be accomplished without the use of a specialized extraction tool, and can be done without disturbing adjacent modules and cables.

Also, while embodiments of the present invention are described in the context of optical transceiver modules used in the field of optical networking, it will be appreciated that the teachings of the present invention are applicable to other applications as well. For example, other types of pluggable electronic modules could utilize embodiments of the latch system to facilitate insertion and extraction from a corresponding host port.

Figure 1:
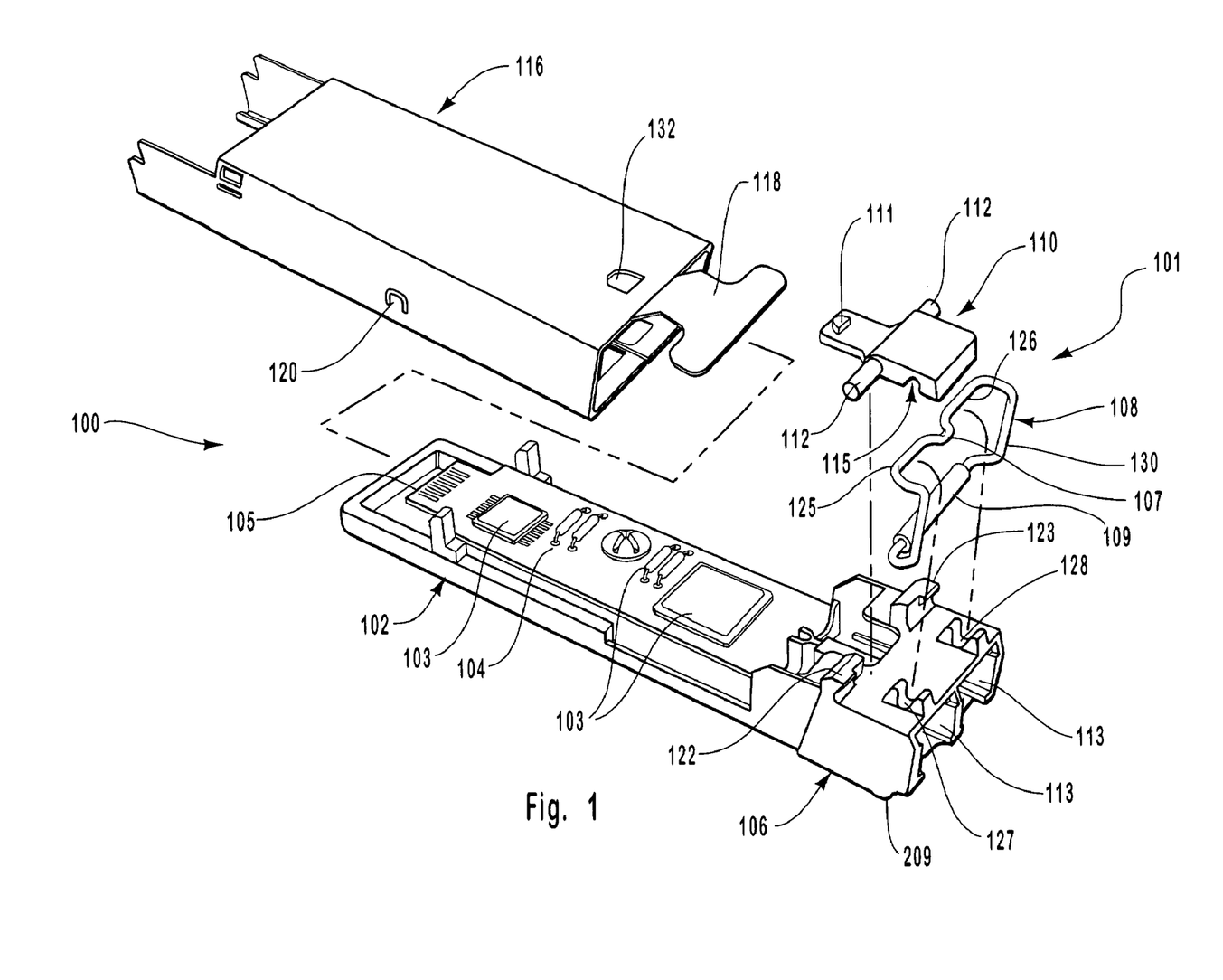
FIG. 1 illustrates an exploded perspective view of one presently preferred embodiment of a transceiver module having an integrated latch system.
Figure 2:
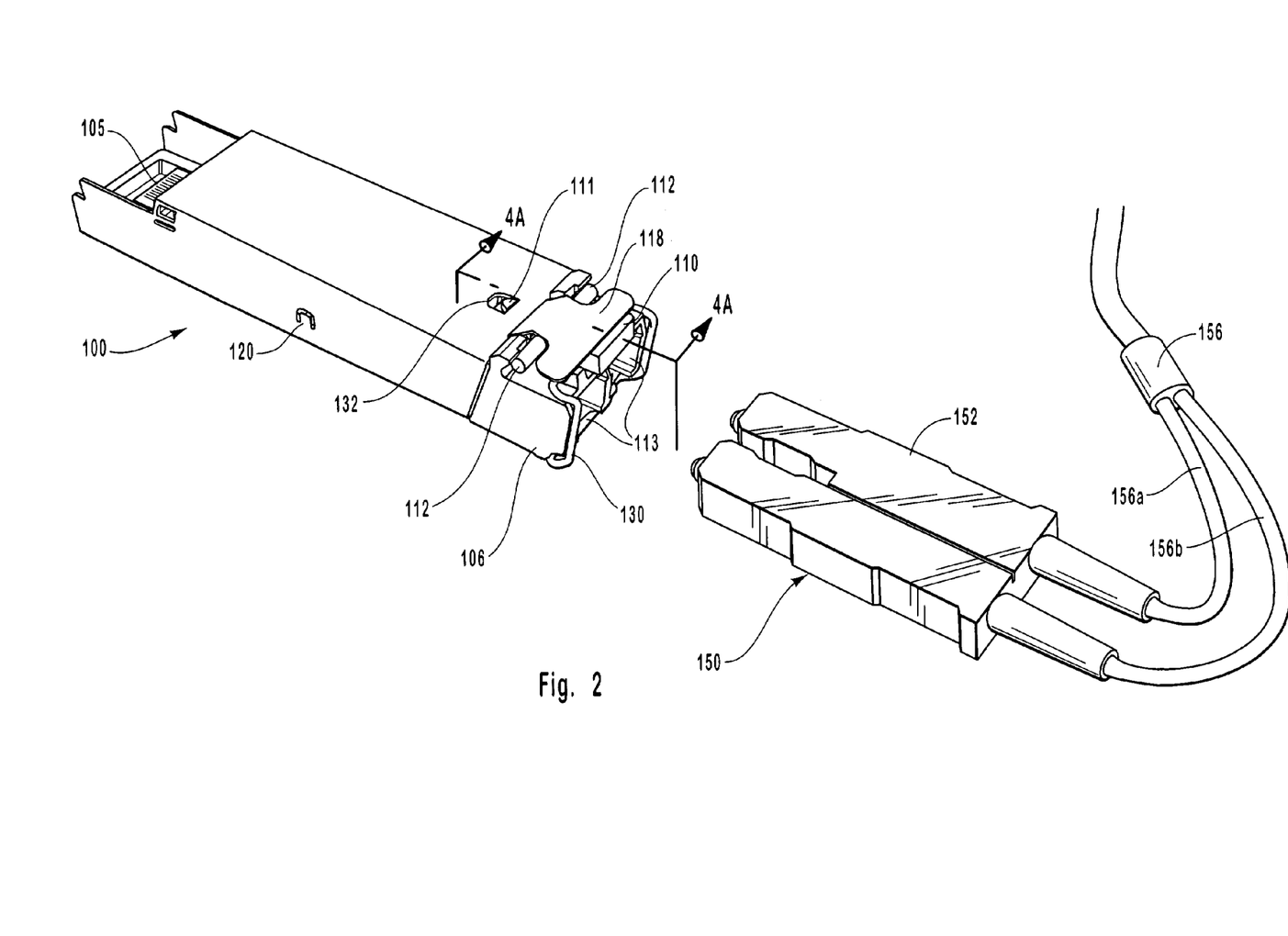
FIG. 2 is a perspective view of an assembled version of the transceiver module and latch system shown in FIG. 1 and a corresponding exemplary modular fiber cable connector and fiber cable assembly.

Reference is first made to FIGS. 1 and 2 together, which illustrate perspective views of one presently preferred embodiment of an optical transceiver module, designated generally at 100. In the illustrated example, the module 100 is comprised of an elongate base portion, designated generally at 102, that is configured to support and retain a printed circuit board 104. In this example, the circuit board accommodates the transceiver electronics 103 and optics (not shown), although it could be comprised of any circuitry or components depending on the type of module being used. Also formed on the printed circuit board 104 at a rear end is an exposed edge connector 105. The edge connector 105 is configured to be electrically compatible with a corresponding electrical connector (not shown) that is positioned within the port of a host device. Other connector schemes that are well known in the art could also be used.

In the illustrated embodiment, a connector portion, designated generally at 106, is positioned at one end of the base portion 102. The connector portion 106 defines a receptacle configuration 113 that operatively receives a corresponding modular fiber connector configuration, such as is typically used to interface with an optical fiber cable. One example of such a fiber connector and cable configuration is shown at 150 in FIG. 2. However, it will be appreciated that the receptacle could be implemented to accommodate any one of a number of different connector configurations, depending on the particular application involved.

As is further shown in FIGS. 1 and 2, the module 100 further includes a latching mechanism, designated generally at 101. In one presently preferred embodiment, the latch mechanism 101 provides several functions. First, the latch mechanism 101 provides a mechanism for "latching" the module 100 within a host port, represented at 200 in FIGS. 3A and 3B, when the module 100 is operatively received within the port. Moreover, as will also be described in further detail, the latch mechanism 101 also provides a convenient means for extracting the module 100 from the port, without the need for a special extraction tool. The latching mechanism is preferably implemented so as to preserve the small form factor of the module 100 in accordance with prevailing standards, and in a manner that allows convenient insertion and extraction of a single module without disturbing adjacent modules or adjacent fiber cables—even when used in a host having a high port density. Also, in a preferred embodiment, the latch mechanism precludes inadvertent extraction of the module 100 from the port when a modular fiber connector 150 is operatively received within the receptacle 113.

By way of example and not limitation, in a preferred embodiment the latch mechanism 101 includes user accessible means for selectively latching the module 100 within a host port, and for extracting the module from the port. By way of example and not limitation, user accessible means can be comprised of a bail, designated generally at 108. Preferably, the bail 108 has a main body portion 130 formed from a rigid metal wire. While the bail 108 could be configured in any one of a number of shapes, in a preferred embodiment the bail 108 is sized and shaped so as to be accessible with a user's finger, or any other common implement, such as a pen or the like. Also, the bail 108 is shaped so as to conform substantially with the shape of the module 100 when the bail is placed in a "latched" position, as is represented in FIG. 2. In this way, the bail does not violate the overall low profile presented by the module 100. Also, in one embodiment, the bail 108 includes a grip or clasp 109 that is formed of a material that allows for easier access and gripping by a user's finger. The clasp 109 can be formed any number of ways, including a cylindrical piece that slides over the bail wire, or alternatively, it could be formed by using an overmold process.

In a preferred embodiment the bail 108 includes a cam 107 that facilitates the latching and unlatching of the module within the port. FIG. 1 illustrates how the cam 107 is provided with a bend formed along a portion of the main body of the bail 108 between two shoulder portions 125 and 126. It will be appreciated that the cam could be implemented along the length of the bail 108 using other techniques. Operation of the bail 108 and cam 107 will be discussed in further detail below.

Figure 1A:
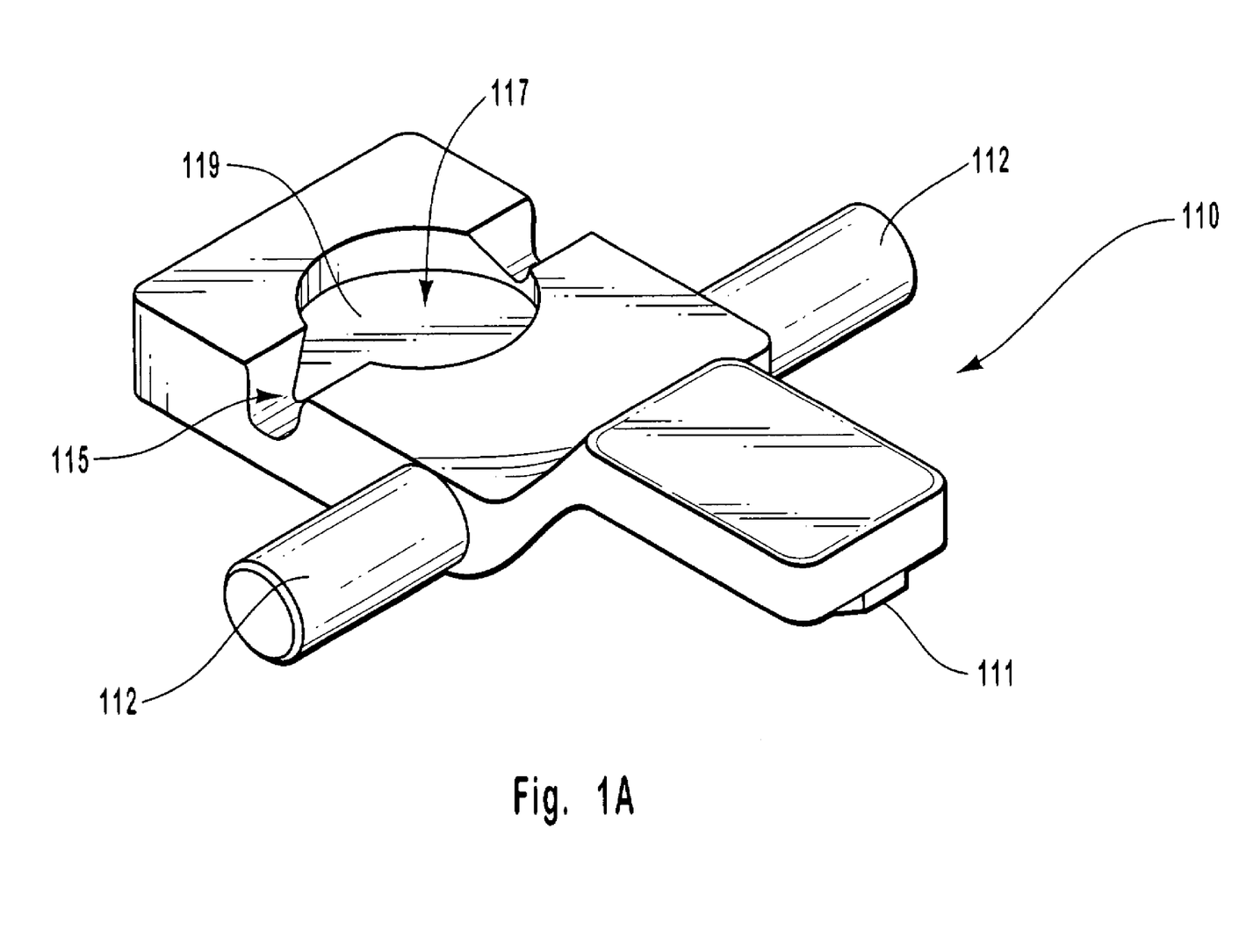
FIG. 1A is a perspective view of the bottom side of the pivot block portion of the latch system.

Making continued reference to FIGS. 1, 1A and 2, formed along the top surface of the connector portion 106 is a retention mechanism for operatively receiving the bail 108. In the embodiment illustrated in FIG. 1, the retention mechanism is comprised of dual retention slots 127 and 128 that are each sized and shaped to receive the corresponding shoulder portions 125, 126 of the bail 108 when the latching system 101 is assembled. In operation of the latching mechanism 101, the retention slots 127, 128 permit rotation of the bail at the shoulder portions. Of course, the retention mechanism could be implemented in a number of different ways. For example, a single retention slot may suffice, or different geometries could be used.

In the illustrated embodiment, the bail 108 is operatively secured to the module 100 by way of an overlying pivot block, designated generally at 110. FIGS. 1 and 1A show how the pivot block 110 includes a pivot recess 115 that accommodates the shoulder portions 125, 126 and the cam portion 107 when the pivot block 110 is disposed on the top surface of the connector block 106 between the retention slots 127 and 128. As is shown in FIG. 1A, which illustrates the bottom of the pivot block 110, the pivot recess 115 preferably includes an enlarged portion 117 that is capable of operatively accommodating the cam portion 107 when the cam 107 is disposed in a horizontal orientation within the enlarged portion 117. Again, the pivot recess 115 and the enlarged portion 117 secure the bail 108 to the module 100 in cooperation with the retention slots 127 and 128, but do so in a manner so as to permit rotation of the bail 108 during operation of the latching mechanism. Rotation of the bail 108 causes the cam portion 107 to operatively engage a cam follower surface 119 formed on the pivot block 110 within portion 117. This is discussed further below.

FIGS. 1 and 1A illustrate how the pivot block 110 also includes a pivot arm 112 disposed along a pivot axis of the block 110. When mounted on the top surface of the connector portion 106 of base 102, each end of the pivot arm 112 is rotatably held within pivot points 122 and 123 that are each formed on the top surface of the connector portion 106. In a preferred embodiment, the latching mechanism further includes means for latching the module 100 within a port slot. This latching means is provided by way of a lock pin 111 formed along the top surface of a pivot end of the block 110. The pin 111 is preferably formed as a wedge having a leading edge 211 that is sloped or otherwise appropriately shaped, so as to facilitate insertion of the module 100 into the host port.

FIGS. 1 and 2 also illustrate how the base portion 102 and the printed circuit board 104 are at least partially enclosed and retained within an outer housing, designated generally at 116. The outer housing 116 is generally rectangular in shape so as to accommodate the base portion 102. The housing 116 includes an opening at its rear end so as to expose the edge connector 105 and thereby permit it to be operatively received within a corresponding electrical connector slot (not shown) within a host port 200. The housing 116 can be formed of any appropriate material and in a preferred embodiment is comprised of sheet metal.

In a preferred embodiment, the housing 116 is also configured so as to provide a portion of the module's latching mechanism 101. For example, the top surface of the housing includes a locking recess 132, which is sized and shaped to expose the lock pin 111 of the pivot block 110 when the latch mechanism is in a latched position, as will be described below. Also, the housing 116 includes a means for biasing the latching mechanism to a latched position. By way of example, in one presently preferred embodiment the biasing means is comprised of a resilient metal portion of the housing that is formed as a leaf spring 118. When assembled (FIG. 2), the leaf spring 118 is biased against the top surface of the pivot block 110 so as to operatively secure it in its assembled position. Also, the biasing action is applied so as to urge the pivot block 110 in a rotational direction about pivot point 112 so as to expose lock pin 11 though locking recess 132. This corresponds to the module being in a latched position.

Figure 3A:
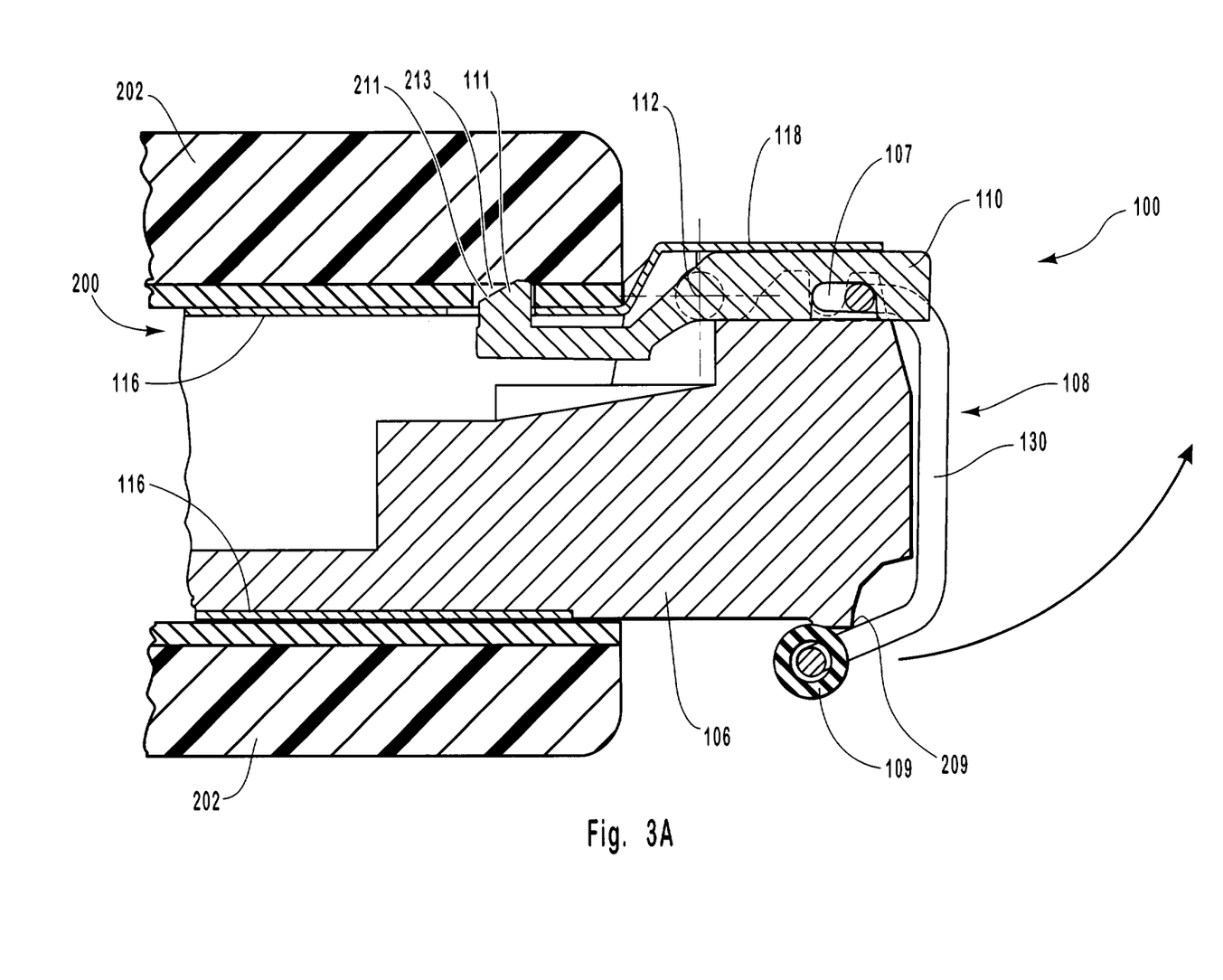
FIG. 3a is a cross sectional view of the transceiver module taken along lines 4A—4A in FIG. 2 that shows a latch system in the latched position.
Figure 3B:
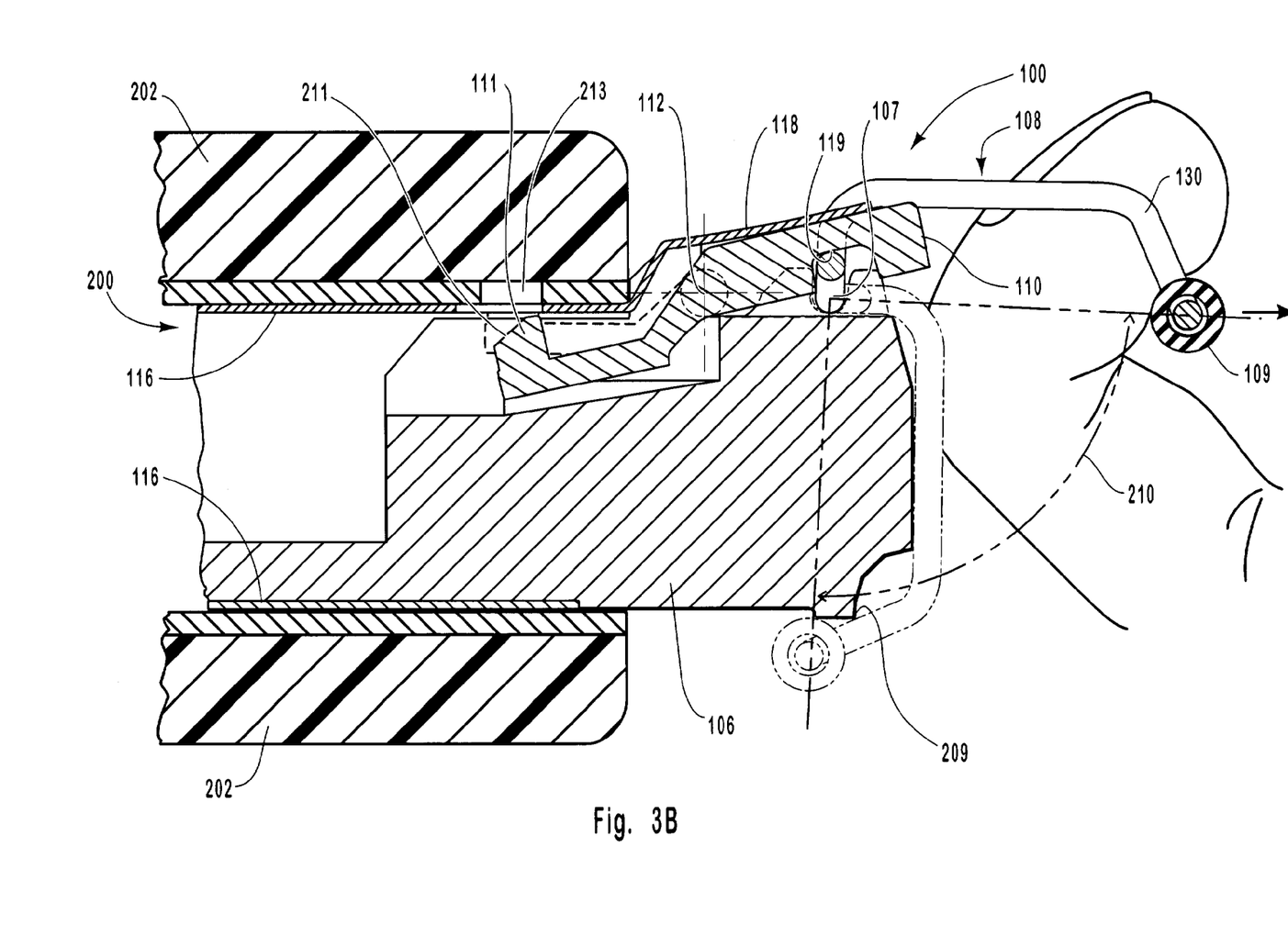
FIG. 3b is a cross sectional view of the transceiver module taken along lines 4A—4A in FIG. 2 that shows a latch system in the unlatched position.

Reference is next made to FIGS. 3A and 3B, which together illustrate the various preferred operating characteristics of the module 100 and its latching mechanism 101. As noted, the transceiver module 100 is capable of being operatively received within an appropriate port, such as is represented at 200 of FIGS. 3A and 3B, of a host system, a portion of which is represented at 202. When operatively received within the port 200, the edge connector 105 is received within a corresponding electrical connector (not shown) disposed within the port 200, so as to provide the requisite electrical interface between the transceiver module 100 and the host 202. Also, at this point the modular cable connector 150 (FIG. 2) of the optical cable 156 can be received within the receptacle 113 of the connector portion 106.

In general, the relative position of the bail 108 governs the operational state of the latching mechanism 101. When placed in a latched position, the module 100 is securely retained within a host port 200. In an unlatched position, the module 100 can be removed from the host port 200. For example, in the latched position, the position of the bail 108 is rotated and placed in a downward direction, as is shown in FIG. 2 and FIG. 3A. In this position, the cam portion 107 of the bail 108 is horizontally disposed within the enlarged portion 117 of the cam follower surface 119 of the pivot recess 115 and is thus not exerting any cam force against the pivot block 110. As such, the leaf spring 118 is biased against the top surface of the pivot block 110 at a point that urges the pivot block 110 in a rotational direction about pivot point 112 so as to expose lock pin 111 though locking recess 132. This lock pin 111 is then able to engage with a corresponding notch or recess 213 that is formed within the port 200 of the host 202. This engagement effectively "latches" the module 100 within the port 202. In a preferred embodiment, the shape and configuration of the bail 108 also allow the cable connector 150 to be received within the modular receptacle 113 when the bail 108 is placed in this latched position. As noted, in this position the bail 108 does not violate the small profile presented by the module 100. To this end, embodiments may include an overcenter lock, or nub 209, provided on a lower edge of the connector portion 106. When placed in the latched position, the clasp 109 snaps over the nub 209 and is retained in that position until disengaged by the user.

The bail 108 is rotated upwardly, as is indicated by the directional arrow in FIG. 3A, to place the latch mechanism 101 into an "unlatched" position, shown in FIG. 3B. Note that this upward rotation of the bail 108 sweeps out an imaginary pie piece-shaped volume 210, which is seen edge-on in FIG. 3B. When the bail 108 is rotated upwardly, the cam portion 107 is rotated to a vertical orientation within enlarged recess portion 117. Because the height of the recess portion 117 is less than that of the vertically extended cam, rotation of the cam 107 exerts an upward force on the cam follower surface 119 of the pivot block 110 formed within the recess portion 117. The force of the cam 107 against the cam follower surface 119 provided on the pivot block overcomes the biasing action provided by the leaf spring 188 and causes the pivot block 110 to pivot in the opposite direction about axis 112. This lowers the pivot lock pin 111 so that it is disengaged from the notch 213 formed within the host port 200. In this unlatched state, the user, by pulling on the lever formed by the bail 108, can remove the module 100 from the port, as is represented in FIG. 3B. Since the bail 108 extends out in front of the module 100, extraction can be accomplished without having to grip the sides of the module, and without disturbing and/or otherwise inadvertently effecting the connection status of an adjacent module or fiber cable. Also, the shape and configuration of the bail 108 insures that it cannot be rotated to the unlatched position while a connector 150 is disposed within the modular receptacle 113. This prevents accidental removal of the module 100 from the port by inadvertently pulling on the connector 150 or cable 156.

Figure 4:
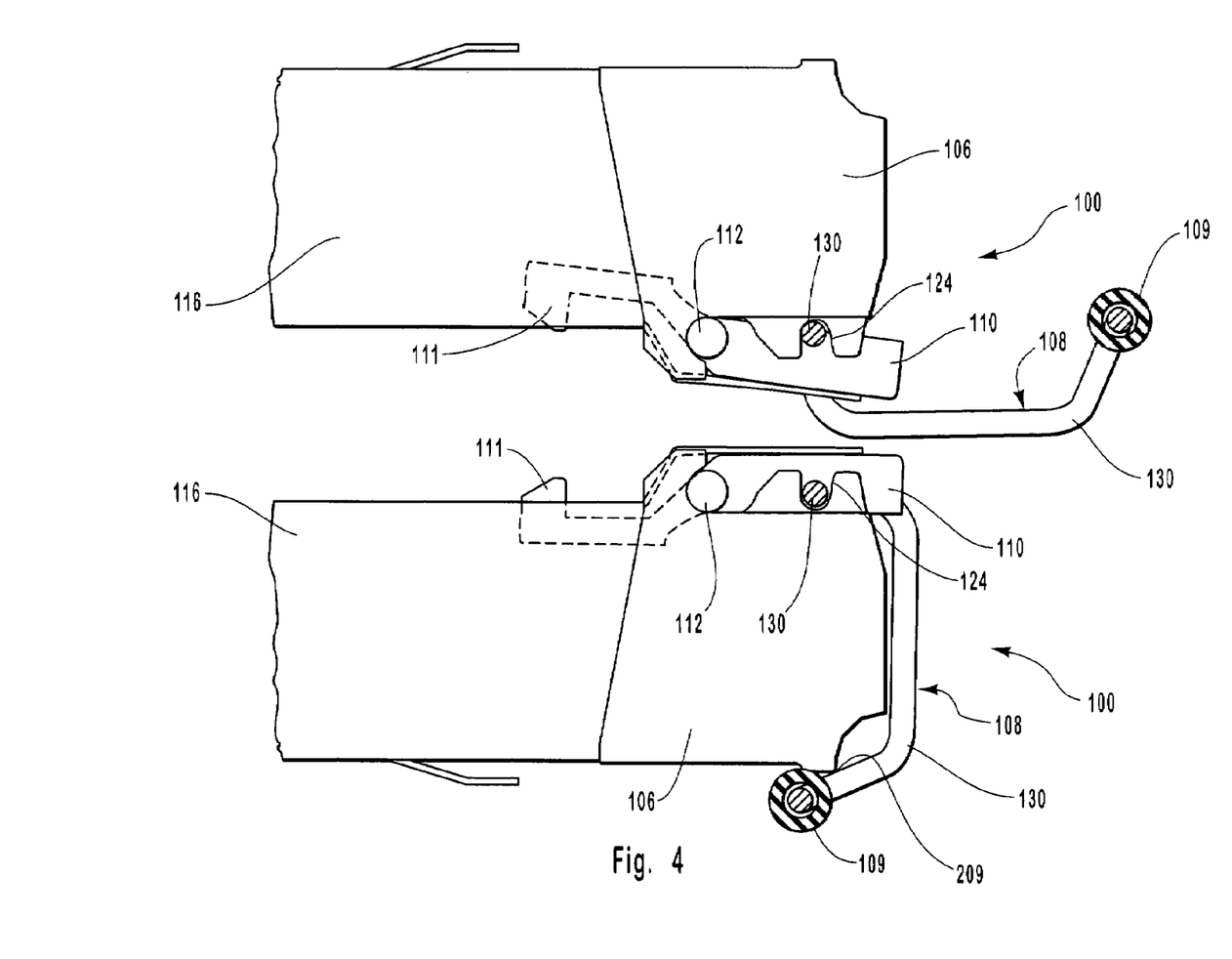
FIG. 4 is a side view of two adjacent transceiver modules with corresponding latch systems in different operational positions.

FIG. 4 illustrates a profile view of two immediately adjacent transceiver modules, placed in what is sometimes referred to as a "belly-to-belly" configuration. This might correspond to a port configuration in a host device having a high port density. The disclosed latching mechanism allows this physical orientation and still permits retraction of one module without disturbing an adjacent module, or the cable of an adjacent module. As is shown, the bail 108 in the upper module can be rotated to an unlatched position so as to permit extraction of that module or the cable of an adjacent module. The bottom module remains in the latched position, and neither it or the cable (not shown) within its receptacle is disturbed by the extraction of the upper module.

Figure 5:
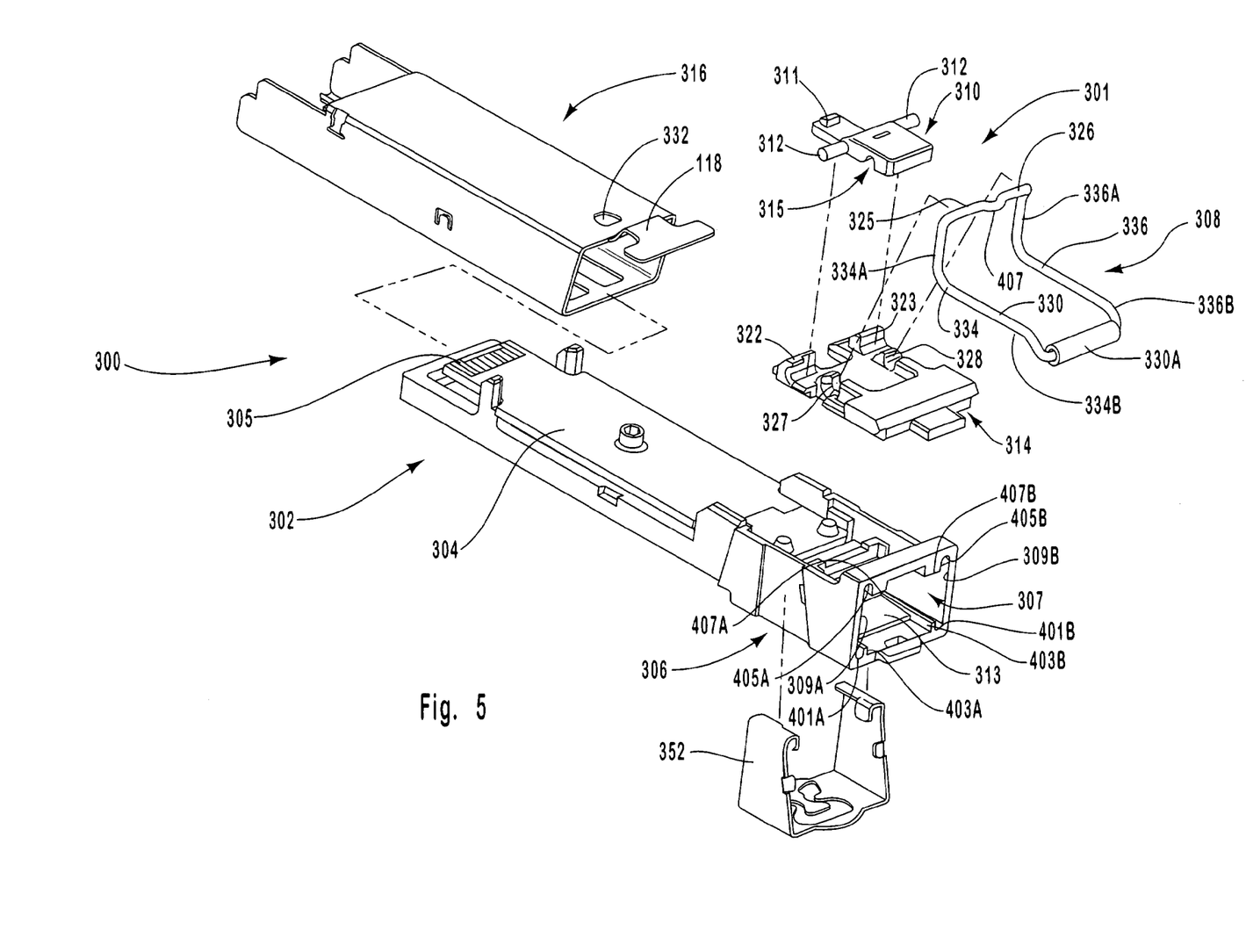
FIG. 5 is an exploded perspective view of another presently preferred embodiment of a transceiver module having an integrated latch system.
Figure 6:
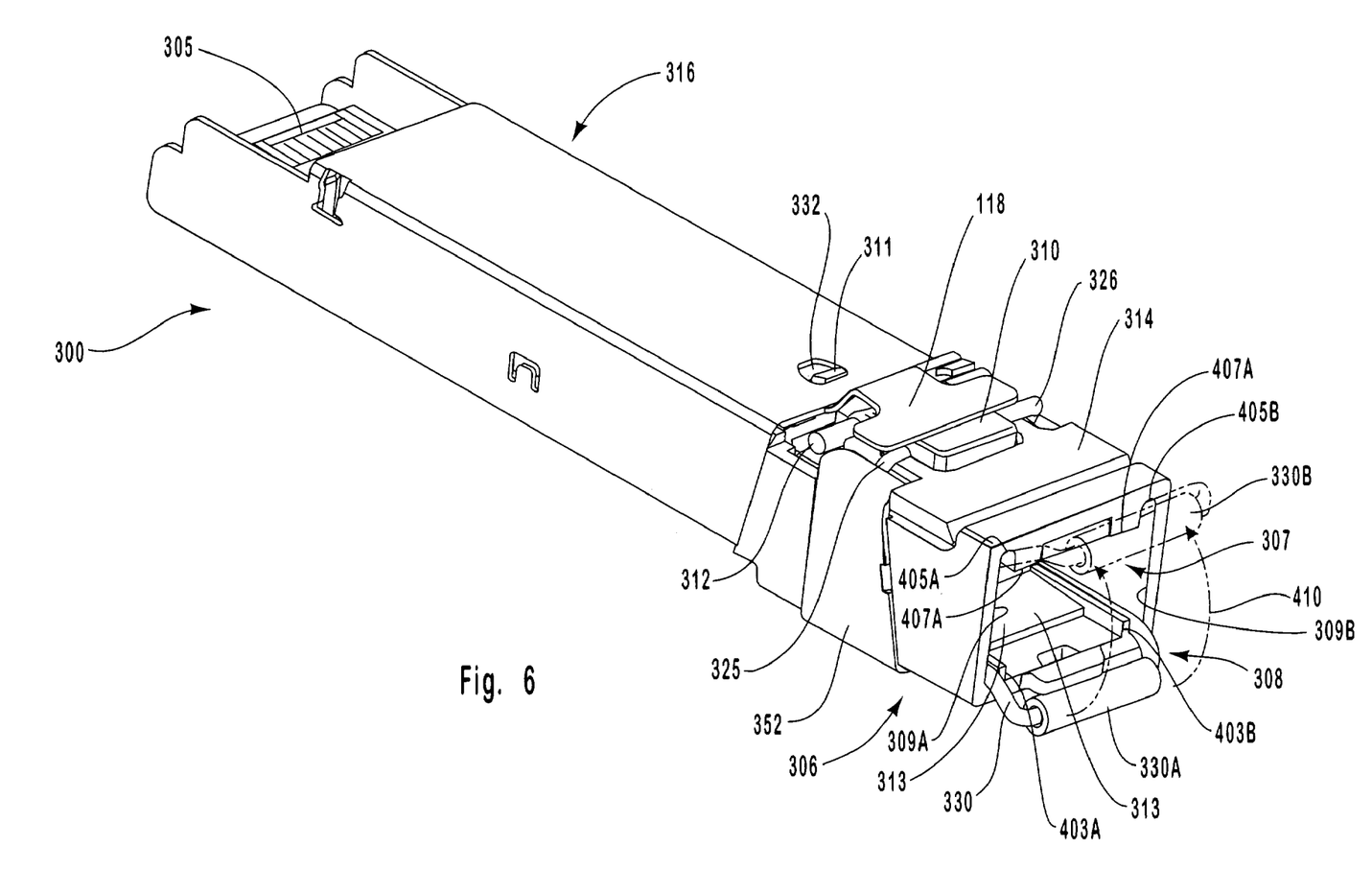
FIG. 6 is a perspective view of an assembled version of the transceiver module and latch system shown in FIG. 5.

Reference will next be made to FIGS. 5 and 6, which together depict another embodiment of an optical transceiver module, designated generally at 300. As will be discussed, the embodiment illustrated in these figures includes various modifications to the latching mechanism as described in the previous embodiment. As before, the latching mechanism includes a user accessible means for selectively latching the module 300 within a host port. However, in the present embodiment, the user accessible means is comprised of a bail, designated generally at 308, that is configured and positioned so as to be substantially disposed within a cavity that forms the connector receptacle portion of the module. Moreover, as is best seen in FIG. 6, the bail 308 remains substantially positioned within this cavity, even as it is selectively rotated from the latched to the unlatched positions. This feature further prevents the bail from inadvertently contacting other objects, such as adjacent modules, cables, etc., when it is disposed in either the latched or unlatched position, or during its operation. Additionally, this embodiment still allows for a module 300 having a low profile form factor. Further, the overall outer profile and periphery of the module 300 is substantially contiguous and devoid of discontinuous surfaces. Again, this increases the ease by which the module can be inserted and retracted from a port. Significantly, the module 300 provides these features and advantages while still conforming to the SFP Transceiver MSA guidelines. Alternatively, the configuration could be used with other module standards as well.

The following description of the present preferred embodiment focuses on the various features and enhancements of the optical transceiver module that differ from, or are in addition to those already discussed in connection with the embodiment described in FIGS. 1–4. As such, only selected differences between the embodiments will be discussed below, and a description of many of the common components will not be repeated here. Although for ease of illustration the following description focuses on an optical transceiver module for use in various fiber optic applications, the concepts discussed are also applicable to other pluggable module implementations that may be employed in a variety of other applications.

Reference is first made to FIGS. 5 and 6, which depict exploded and assembled perspective views, respectively, of an embodiment of the optical transceiver module 300. As is shown, the module 300 generally comprises an outer housing 316, an elongate base portion 302, a printed circuit board 304, and a latching mechanism 301 that includes a bail 308. The outer housing 316 is substantially identical to the housing 116 discussed in the previous preferred embodiment. Also as before, the base portion 302 is configured to support and retain the printed circuit board 304, which has disposed on its rear end an edge connector 305.

A connector portion 306 is positioned at the front end of the base portion 302. The connector portion 306 partially defines a cavity, generally designated at 307, that forms a receptacle 313 that is sized and shaped to operably interface with an optical fiber cable connector. Again, the receptacle 313 could be implemented so as to accommodate any one of a number of different connector configurations, depending on the particular application involved. Examples include, but are not limited to, a Fiber Channel connector and an Infiniband connector. The connector portion 306 may be implemented as a separate piece that is attached to the base portion, or it may be formed integrally with the base portion 302.

In addition to defining the receptacle 313, the cavity 307 accommodates the bail 308 in a manner so that a substantial portion of the bail 308 is operatively disposed within the module. For example, in the preferred embodiment, the cavity 307 includes side surfaces 309A and 309B. The distance between the side surfaces 309A, 309B define a width that is able to accommodate an optical fiber cable connector (or other cable connector, depending on the application involved) in the receptacle portion 313, and at the same time, accommodate the bail 308. Also, as is shown in FIGS. 5 and 6 the arms 334, 336 of the bail 308 rest within retention slots—401A and 401B along the bottom of the cavity, and 405A and 405B along the top of the cavity 307—when the bail is in a latched or an unlatched position. These retention slots are formed by providing a space between the respective side walls 309A and 309B, and ridges formed along the bottom (403A and 403B) and top (407A and 407B) of the cavity 307. The retention slots ensure a separation between the bail and the received cable connector, and also provide a level of structural stability to the bail within the cavity when it is in a latched or unlatched position.

In the illustrated embodiment of FIGS. 5 and 6, the latching mechanism 301 generally comprises a pivot block 310, a mounting plate 314, and the bail 308. In the embodiment shown, the pivot block 310 is substantially similar to the pivot block 110 of the previous embodiment, and includes a pivot pin 311, pivot arms 312, and a pivot recess 315.

The mounting plate 314 includes mounting and pivot components for use in operatively interconnecting the pivot block 310, the bail 308 and the module 300. For example, the mounting plate 314 includes retention slots 327 and 328, as well as pivot points 322 and 323. As is best seen in FIG. 6, the mounting plate 314 is at least partially and operatively attached to the base 302 via a clip 352 that is substantially disposed about the outer surface of the base. Preferably, the outer surface of the clip 352, when mounted to the module, is substantially contiguous with the other portions of the module. This ensures a module periphery that is substantially contiguous and without edges, so that the module is easy to insert within a port. When mounted, the mounting plate 314 is positioned substantially above the receptacle 313. Alternatively, the mounting plate 314 could be integrally formed with the connector portion 306, for example as is shown in the previously described embodiments.

In the illustrated embodiment, the bail 308 is shaped so as to selectively operate substantially within the cavity 307. As previously mentioned, this minimizes the extent to which the bail 308 extends beyond the front of the module 300, thereby protecting the bail from damage or inadvertent contact with other adjacent modules or cables when it is rotated from its latched or unlatched position. In the illustrated embodiment, the bail 308 comprises a main body portion 330 preferably formed of a rigid metal wire that includes a cam 407 disposed between shoulder portions 325 and 326, similar to the previous embodiment. The bail 308 also includes a lever grip portion 330A suitable for grasping by a user's finger (or similar implement) when the module 300 is removed from a host port 200. As is shown, while the majority of the bail remains disposed within the cavity 307, the grip portion 330A remains substantially external to the cavity so as to be accessible by a user.

The bail 308 further comprises connecting arms 334 and 336 that extend between the lever portion 330A and each of the shoulders 325 and 326. The connecting arms 334 and 336 enable the cam 307 to operate against the pivot block 310 and rotate it when the lever portion 330A is moved from either the latched or unlatched position. Specific to this embodiment, each connecting arm 334 and 336 is shaped to enable the above rotation while remaining substantially disposed within the cavity 307. As is seen in FIG. 5, the connecting arms 334 and 336 comprise first segments 334A and 336A, and second segments 334B and 336B that are angled with respect to the first segments. It will be appreciated, of course, that the bail 308 could comprise other shaped configurations in order to provide similar functionality. For example, the bail could comprise only one connecting arm, if desired.

Particular reference is now made to FIG. 6, which shows the module 300 in its assembled configuration. In such a configuration, the shoulder portions 325 and 326 of the bail 308 are operatively disposed within the retention slots 327 and 328 in a manner similar to that described in connection with the previous embodiment. Moreover, the connecting arms 334 and 336 are configured so as to be disposed within the retention slots defined on either side of the cavity 307 when placed in a latched (slots 401A, 401B) and an unlatched (slots 405A, 405B) position. The other components comprising the latching mechanism 301 are assembled substantially as described above in the previous embodiment. Further, operation of the latching mechanism 301—aside from the fact that the bail 308 is substantially disposed within the module—is substantially similar to that of the previous embodiments.

The bail 308 is shown in FIG. 6 in its latched position; that is, it is positioned such that the pivot pin 311 is exposed through a locking recess 332 in the outer housing 316 to engage the recess 213 in the host port 200. In this position, the receptacle 313 is able to receive the connector of an optical fiber cable for connection with the module 300. As with the previous embodiment, once a fiber cable is connected to the module 300 via the receptacle 313, the bail 308 is prevented from rotating to its unlatched position.

FIG. 6 also shows in phantom the unlatched position of the bail 308. In this position, as before, the module 300 is able to be retracted from port 200 of the host device 202. To transfer the bail 308 from the latched position to the unlatched position in the illustrated embodiment, the fiber cable connector is removed from the receptacle 313. Then, a user grasps the lever 330A and rotates the bail 308 toward the unlatched position. This force causes the connecting arms 334 and 336 to translate through the slots defined on either side of the cavity 307, which in turn causes the cam to rotate within the pivot recess and rotate the pivot block 310. As already explained, rotation of the pivot block 310 causes the pivot pin 311 to disengage the recess 213 of the host port 200, thereby enabling the module 300 to be removed from the host port.

Note that the movement of the connecting arms 334, 336 and the lever portion 330A of the bail 308 when transferred from the latched position to the unlatched position sweep out an imaginary pie piece-shaped volume, which is partially depicted at phantom lines 410 in FIG. 6. In contrast to the volume 210 swept out by the bail 108 in the previous embodiment as shown in FIG. 3B, a substantial portion of the volume 410 is contained within the cavity 309 defined by the connector portion 306. This is due to the disposition of the bail 308 in the present embodiment substantially within the cavity 307. Significantly, this design enables rotation of the bail 308 from the latched to the unlatched position while protecting a significant portion of the bail within the module 300 such that inadvertent contact between the bail and other objects, such as cables attached to other adjacent modules, is prevented. This, in turn, helps ensure that movement of the bail from either the latched or the unlatched position is unimpeded such that removal of the module from the port of the host device is accomplished at will. Finally, the above functionality is implemented so as to preserve the desired small form factor of the module in accordance with prevailing standards.

To summarize, embodiments of the present invention provide a number of advantages over existing pluggable electronic module designs. The disclosed electronic module utilizes a unique latching mechanism that allows the module to be easily extracted from a host port—even in environments having a high port density. In particular, the latching mechanism allows a module to be retrieved from a port without the need for specialized extraction tools, and in a manner that does not disturb adjacent modules and/or adjacent fiber cables. Moreover, when a cable connector is operatively received within the port's receptacle, the latching mechanism insures that the module is latched within the port, and is not extracted by inadvertently pulling on the plug or cable. Finally, the latching mechanism is implemented in a manner so as to preserve the overall low profile presented by the module, as is required by existing industry standards.

It will be evident that there are numerous embodiments of the present invention, which, while not specifically described above, are clearly within the scope and spirit of the invention. Consequently, the above description is considered to be exemplary only, and the full scope of the invention is to be determined solely by the appended claims.

What is claimed and desired to be secured by United States Letters Patent is:

1. A fiber optic transceiver module having transceiver electronics and optics to convert optical signals into electrical signals or electrical signals into optical signals, the module comprising:
   a fiber optic cable receptacle that is capable of receiving one or more fiber optic cable connectors;
   a locking member; and
   a moveable bail lever including a cam portion, the bail lever being configured to allow removal of the module from within a host port, wherein movement of the bail lever causes the cam portion to manipulate the locking member in a manner so as disengage the module from within the host port, wherein the locking member is manipulated by the cam portion via a pivot block.

2. A fiber optic transceiver module as defined in claim 1, wherein at least a portion of the moveable bail lever is shaped so as to be disposed substantially about an outer periphery of a fiber optic cable connector when the connector is received within the fiber optic cable receptacle.

3. A fiber optic transceiver module as defined in claim 1, wherein the moveable bail lever is shaped so as to prevent the manipulation of the locking member when a fiber optic cable connector is disposed within the fiber optic cable receptacle.

4. A fiber optic transceiver module having transceiver electronics and optics to convert optical signals into electrical signals or electrical signals into optical signals, the module comprising:
   a fiber optic cable receptacle that is capable of receiving one or more fiber optic cable connectors;
   a locking member; and
   a moveable bail lever configured to allow removal of the module from within a host port, wherein movement of the bail lever manipulates the locking member in a manner so as disengage the module from within the host port;
   wherein the moveable bail lever comprises a cam member, wherein movement of the bail lever causes the cam member to manipulate the locking member between at least a latched position and an unlatched position; and wherein the locking member is manipulated by the cam member via a pivot block.

5. An optical transceiver module, comprising:
a housing including a resilient member; and
a latch mechanism that is biased into a latched position by the resilient member of the housing, the latch mechanism comprising:
- a lock member configured and arranged to assume a first position wherein the module is latched to a host port, and to assume a second position wherein the module is unlatched from the host port; and
- a bail that is operably interconnected with the lock member so that movement of the bail corresponds with a change in position of the lock member.

6. The optical transceiver module as recited in claim 5, wherein the housing defines a locking recess through which the lock member at least partially extends when the lock member has assumed the first position.

7. The optical transceiver module as recited in claim 5, wherein the optical transceiver module substantially complies with the SFP MSA.

8. The optical transceiver module as recited in claim 5, wherein the bail includes a cam portion configured and arranged to interact with a cam follower surface, the cam follower surface being operably disposed with respect to the lock member such that movement of the cam portion of the bail along the cam follower surface is associated with a corresponding movement of the lock member.

9. The optical transceiver module as recited in claim 5, further comprising a connector portion upon which a portion of the latch mechanism is positioned, the connector portion being at least indirectly attached to the housing and defining a fiber optic cable receptacle configured to receive a fiber optic cable connector.

10. The optical transceiver module as recited in claim 5, wherein the lock member comprises a portion of a pivot block that defines a cam follower surface arranged for contact with a cam portion of the bail.

11. The optical transceiver module as recited in claim 10, wherein the cam portion of the bail is at least partially confined within the pivot block.

12. An optical transceiver module, comprising:
a housing including a resilient member and defining a locking recess;
a base portion attached to the housing;
a connector portion attached to the base portion and defining a fiber optic cable receptacle configured to receive a fiber optic cable connector; and
a latch mechanism that is biased into a latched position by the resilient member of the housing, the latch mechanism comprising:
- a pivot block rotatably attached to the connector portion and including a lock member and a cam follower surface, the lock member being configured and arranged to assume a first position wherein the lock member extends at least partially through the locking recess so that the module is latched to a host port, and to assume a second position wherein the lock member is retracted so that the module is unlatched from the host port; and
- a bail retained on the connector portion by the pivot block, the bail including a cam portion arranged for contact with the cam follower surface of the pivot block so that movement of the cam portion along the cam follower surface corresponds with a change in position of the lock member.

13. The optical transceiver module as recited in claim 12, wherein the optical transceiver module substantially complies with the SFP MSA.

14. The optical transceiver module as recited in claim 12, wherein the bail comprises wire.

15. The optical transceiver module as recited in claim 12, wherein the cam portion of the bail is at least partially confined within the pivot block.

16. The optical transceiver module as recited in claim 12, wherein the connector portion includes an overcenter lock positioned to limit motion of the bail.

17. An optical transceiver module, comprising:
a housing including a resilient member;
a connector portion at least indirectly attached to the housing and defining a fiber optic cable receptacle configured to receive a fiber optic cable connector; and
a latch mechanism that is biased into a latched position by the resilient member of the housing, the latch mechanism comprising:
- a lock member configured and arranged to assume a first position wherein the module is latched to a host port, and to assume a second position wherein the module is unlatched from the host port; and
- a bail that is operably interconnected with the lock member so that movement of the bail corresponds with a change in position of the lock member, the bail being substantially disposed within the connector portion both when the latch mechanism is in the latched position and when the latch mechanism is in the unlatched position.

18. The optical transceiver module as recited in claim 17, wherein the optical transceiver module substantially complies with the SFP MSA.

19. The optical transceiver module as recited in claim 17, further comprising:
a base to which the connector portion is attached, the base being attached to the housing;
a mount plate rotatably supporting the bail;
a clip attaching the mounting plate to the base; and
a pivot block that includes the lock member and which is rotatably positioned on the mounting plate, the pivot block facilitating retention of the bail on the mounting plate, and the pivot block including a cam follower surface arranged for contact with a cam portion of the bail so that movement of the cam portion along the cam follower surface corresponds with a change in position of the lock member.

* * * * *

UNITED STATES PATENT AND TRADEMARK OFFICE
CERTIFICATE OF CORRECTION

PATENT NO. : 7,066,746 B1  
APPLICATION NO. : 10/389509  
DATED : June 27, 2006  
INVENTOR(S) : Togami et al.

Page 1 of 1

It is certified that error appears in the above-identified patent and that said Letters Patent is hereby corrected as shown below:

Column 5
Line 60, after "mechanism", insert --101--
Line 67, after "mechanism", insert --101--

Column 7
Line 41, change "11" to --111--

Column 8
Line 34, change "188" to --118--

Signed and Sealed this

Twenty-second Day of December, 2009

David J. Kappos
*Director of the United States Patent and Trademark Office*